(12) United States Patent
Shim et al.

(10) Patent No.: US 6,264,141 B1
(45) Date of Patent: Jul. 24, 2001

(54) AIRCRAFT DECOMPRESSION PROTECTION PANEL

(75) Inventors: Hyo S. Shim, Cerritos; Steve A. Wiles, Los Alamitos, both of CA (US)

(73) Assignee: McDonnell Douglas Corporation, Hazelwood, MO (US)

( * ) Notice: Subject to any disclaimer, the term of this patent is extended or adjusted under 35 U.S.C. 154(b) by 328 days.

(21) Appl. No.: 08/802,582

(22) Filed: Feb. 19, 1997

(51) Int. Cl.$^7$ .................................................. B64C 1/10
(52) U.S. Cl. ............................................................ 244/118.5
(58) Field of Search ........................... 244/121, 118.5, 244/129.1; 137/68.19, 68.23, 68.27

(56) References Cited

U.S. PATENT DOCUMENTS

| | | |
|---|---|---|
| 2,679,467 | * 5/1954 | Sherts . |
| 3,845,879 | * 11/1974 | Dernbach et al. . |
| 3,938,764 | * 2/1976 | McIntyre et al. . |
| 4,033,247 | * 7/1977 | Murphy . |
| 4,089,140 | 5/1978 | McIntyre et al. . |
| 4,269,376 | 5/1981 | Haux et al. . |
| 4,390,152 | 6/1983 | Jorgensen . |
| 4,612,739 | 9/1986 | Wilson . |
| 4,703,908 | 11/1987 | Correge et al. . |
| 4,828,206 | * 5/1989 | Bruno et al. . |
| 4,899,960 | 2/1990 | Hararat-Tehrani et al. . |
| 5,002,085 | * 3/1991 | FitzGerald . |
| 5,069,401 | 12/1991 | Shepherd et al. . |
| 5,085,017 | 2/1992 | Hararat-Tehrani . |
| 5,118,053 | 6/1992 | Singh et al. . |

FOREIGN PATENT DOCUMENTS

651167 * 3/1979 (RU) .................................. 137/68.23

OTHER PUBLICATIONS

"McDonnell Douglas DC–10", article, FLIGHT International, 7 pgs.

* cited by examiner

Primary Examiner—Charles T. Jordan
Assistant Examiner—Tien Dinh
(74) Attorney, Agent, or Firm—Brooks & Kushman P.C.

(57) ABSTRACT

A frangible aircraft floor includes a floor support having at least one opening formed therethrough. A thin film is positioned with respect to the opening and is provided with a frangible seam which ruptures when a predetermined pressure difference exists on opposing sides of the film to allow increased airflow through the opening to equalize pressure between the compartments in the event of a sudden loss in pressure.

12 Claims, 2 Drawing Sheets

AIRCRAFT DECOMPRESSION PROTECTION PANEL

TECHNICAL FIELD

The present invention relates to a frangible aircraft floor comprising a perforated thin film for aircraft decompression protection.

BACKGROUND ART

Wide-bodied commercial jet aircraft are potentially subject to critical damage to the passenger compartment floor as a result of a large hole made in a lower cargo compartment, such as a hole formed by the sudden opening of a cargo door or a small bomb explosion, while the airplane cabin and cargo compartments are at a high pressure differential with respect to the outside atmospheric air pressure. Upon rapid decompression of the lower cargo compartment, severe downloads may be placed on the passenger floor due to the air pressure above the floor. The air above the floor cannot escape rapidly into the cargo compartment and eventually to atmosphere, as the passenger compartment floor is normally made as a sealed floor due to air conditioning requirements, noise requirements, liquid spillage prevention requirements and appearance considerations. Consequently, because of this pressure differential, structural damage to the floor and nearby components, controls, and systems may occur, with the safety of the aircraft potentially placed in jeopardy.

A relatively new Federal Aviation Administration rule has required that airframe manufacturers either strengthen the floor structure to withstand the sudden differential pressure load, or increase the venting capacity between the upper and lower compartments in order to reduce the maximum differential pressure to a level which the existing floor could withstand.

Since strengthening of the floor structure would require significant weight increase, which would adversely affect aircraft performance, a decompression vent box was developed to increase the venting capacity between upper and lower compartments. This vent box is described below with reference to FIGS. 1 and 2.

The decompression vent box 10, shown in FIGS. 1 and 2, is provided for allowing air flow through the floor support opening 12 in the event of decompression. The vent box 10 comprises a collapsible diaphragm 14 hinged between a baffle 16 and face panel 18. A spring 20 holds the vent box 10 in the closed position, as shown in FIG. 1, until a negative pressure differential force acting against the hinged diaphragm 14 pivots the face panel 18 and collapses the hinged diaphragm 14, as shown in FIG. 2, to allow air flow through the floor support opening 12. Accordingly, in the event of a sudden opening of a large hole in the lower cargo compartment, the diaphragm will collapse and expose the floor support opening 12, which is large enough to handle increased venting to reduce the differential pressure to a level which the existing floor could withstand. Also, in the case of sudden decompression in the upper compartment due to loss of cabin door or holes in the upper fuselage skin due to fan blade penetration as the result of an uncontained engine failure, the hinged flapper 17 in the face panel 18 swings open to allow increased airflow to increase venting and reduce the differential pressure to a level which the floor can withstand.

Under normal operation, small holes formed in the hinged flapper 17 act as a flow-controlling orifice to allow limited air movement therethrough.

Some problems with this vent box design are that it may add approximately 450 pounds of weight to the aircraft, its reliability has been questioned, and it has been known to leak uncontrollably.

Accordingly, it is desirable to provide a frangible aircraft floor with reduced weight and improved reliability.

DISCLOSURE OF INVENTION

The present invention overcomes the above-referenced shortcomings described with reference to the prior art by providing a frangible aircraft floor which includes a th in film positioned over a floor support opening, wherein the film is perforated in a manner to rupture when a predetermined pressure difference exists on opposing sides of the film, thereby allowing increased airflow through the opening for pressure equalization.

In one embodiment, the present invention provides a frangible aircraft floor including a floor support having at least one opening formed therethrough, and a frame secured over the opening. A thin film is positioned over the frame. The film comprises a plurality of apertures form e d therein to allow minimal airflow therethrough for normal ventilation. The thin film also has a perforation configured to rupture when a predetermined pressure difference exists on opposing sides of the film.

The present invention also provides a method of equalizing pressure in an airplane between a passenger compartment and a cargo compartment positioned below the passenger compartment and separated therefrom by a floor assembly. The method comprises positioning a thin frangible film having an aperture therein upon a floor support having an opening extending between the passenger and cargo compartments. The pressure is equalized between the passenger and cargo compartments during normal operating conditions by freely passing air through the aperture in the thin frangible film. The thin frangible film is automatically ruptured when a predetermined pressure difference exists between the passenger and cargo compartments in order to allow airflow through the floor support enabling rapid pressure equalization between the passenger and cargo compartments in the event of a sudden loss of pressure in one of the compartments, thereby limiting pressure load on the floor assembly.

The present invention provides a frangible aircraft floor comprising a thin perforated film positioned over a floor support opening, such that a predetermined pressure difference will tear the perforation to allow increased air flow through the opening. The frangible aircraft floor of the present invention reduces weight and improves reliability.

The above objects and other objects, features, and advantages of the present invention are readily apparent from the following detailed description of the best modes for carrying out the invention when taken in connection with the accompanying drawings.

While embodiments of this invention a re illustrated and disclosed, these embodiments should not be construed to limit the claims. It is anticipated that various modifications and alternative designs may be made without departing from the scope of this invention.

DETAILED DESCRIPTION OF THE INVENTION

Figure 1:
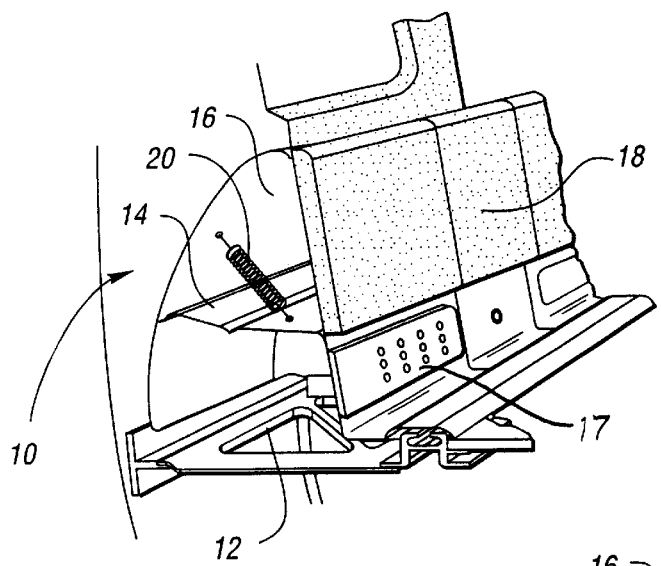
FIG. 1 shows a perspective view of a prior art vent box, with the vent box in the closed position.
Figure 2:
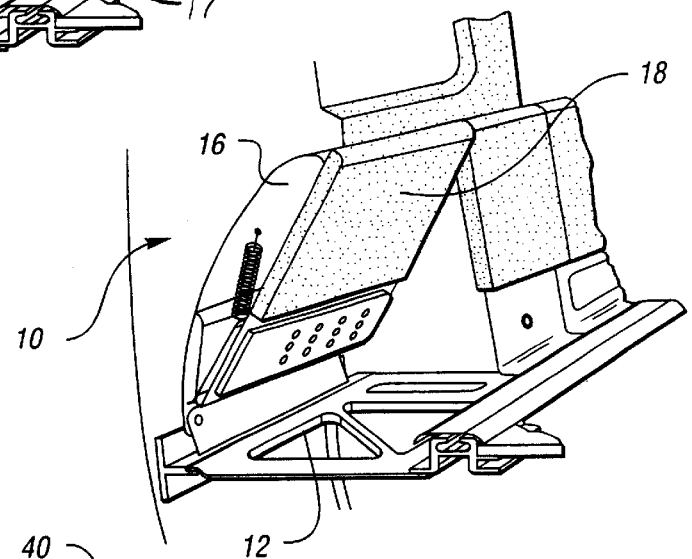
FIG. 2 shows a perspective view of a prior art vent box, with the vent box in the collapsed, open position.
Figure 3:
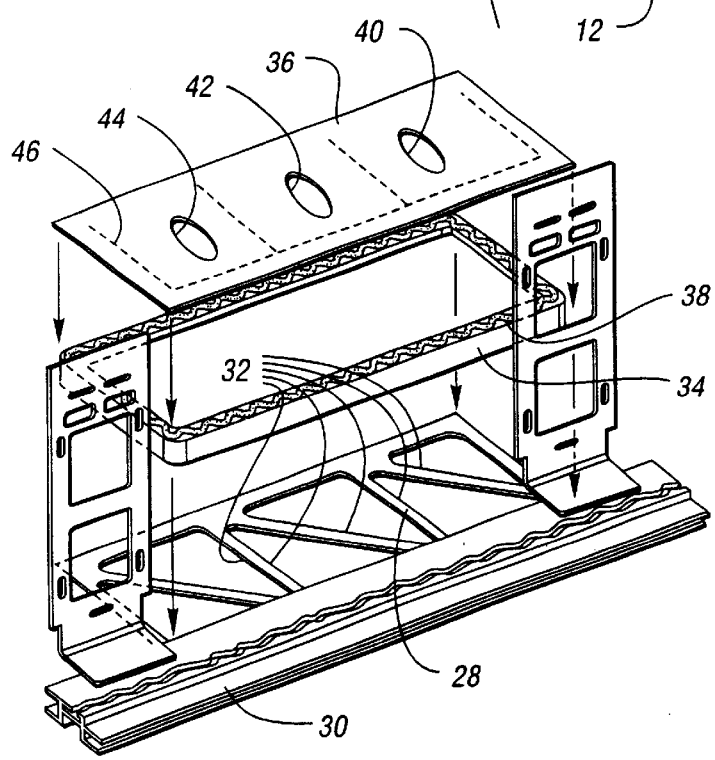
FIG. 3 shows an exploded perspective view of a frangible aircraft floor in accordance with a first embodiment of the present invention.

FIG. 3 shows an exploded perspective view of a frangible aircraft floor assembly 26 in accordance with a first embodiment of the present invention. This embodiment comprises a support floor 28 secured adjacent a seat track 30. The support floor 28 includes several openings 32 formed therein. This support floor 28 is positioned between the upper passenger compartment and lower cargo compartment of a commercial aircraft along the outer walls thereof.

As shown, a frame 34 is positioned over the openings 32 on the support floor 28, and a thin film 36 is secured to the frame 34 by means of a silicon adhesive 38. Of course, any means of attachment could be used. The frame may also be provided with a foam gasket to eliminate leakage in the side wall area.

The thin film 36 includes apertures 40, 42, 44 formed therethrough to allow limited air flow through the film 36 under normal operating conditions. The apertures 40,42,44 are preferably sized to allow a minimum flow rate of 56 c.f.m. at 1/27 psi ΔP. The film 36 could comprise, for example, mylar, radel (manufactured by Amoco), etc. In a preferred embodiment, the film 36 is 0.0002" thick, but this thickness could vary. The film 36 also includes a frangible seam, such as the perforation pattern 46, which comprises a plurality of intersecting perforation lines. The frangible seam could be a perforation pattern, score line, weld line, etc. The perforation pattern is configured in a manner such that a major portion of the film 36 is ruptured when a predetermined pressure difference exists on opposing sides of the film 36 in order to allow increased air flow through the openings 32 in the support floor 28. The rupture pressure will vary depending upon the aircraft. The preferred range is between 0.2 and 0.75 psi ΔP, with the target being 0.5 psi ΔP.

Figure 4:
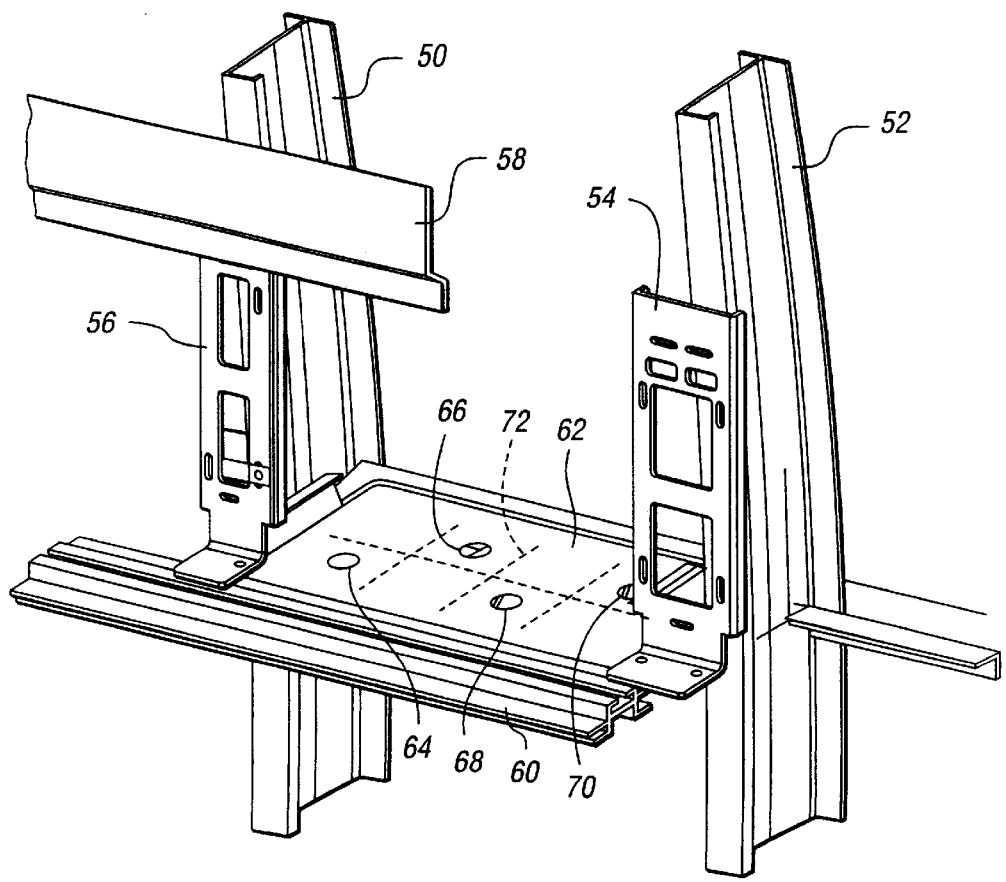
FIG. 4 shows a cut-away perspective view of a frangible aircraft floor in accordance with a second embodiment of the present invention.
Figure 5:
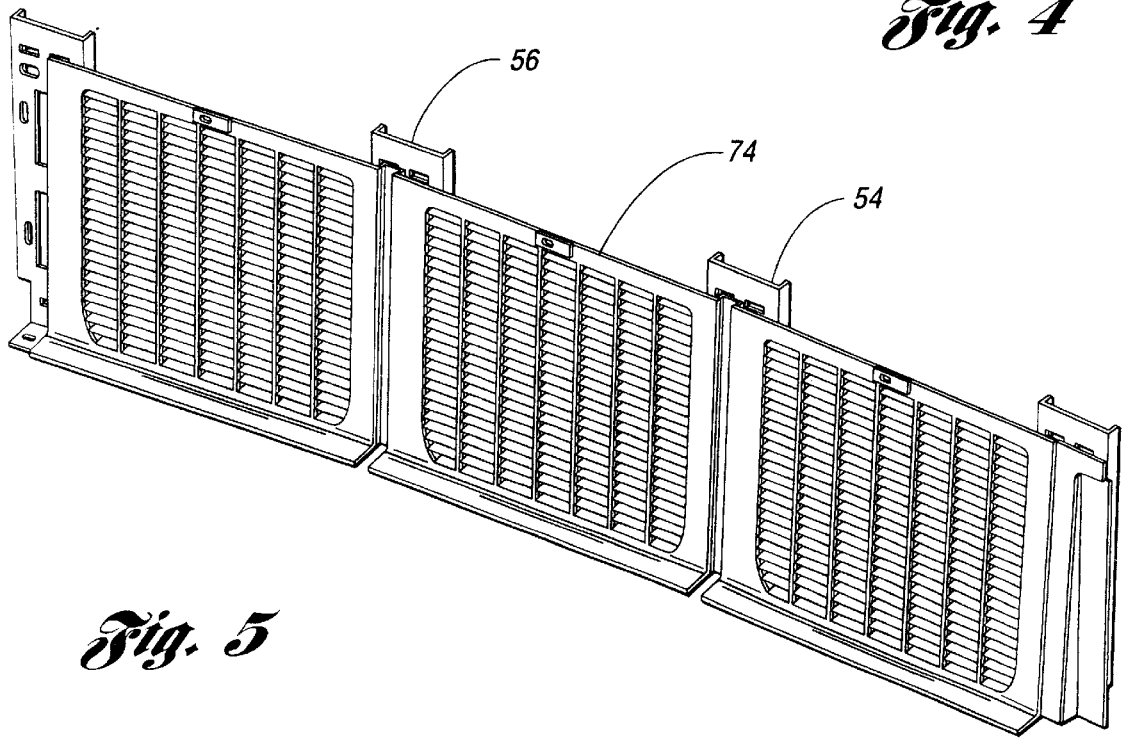
FIG. 5 shows a perspective view of a grill for use with the frangible aircraft floor shown in FIG. 4.

Turning to FIGS. 4 and 5, a second embodiment of the present invention is shown. In this embodiment, frame members 50,52 include support members 54,56 secured thereto, with a side wall panel 58 and seat track 60 positioned against the frame members 50,52. As shown in FIG. 4, a thin film 62 is provided with apertures 64,66 formed therein, as well as a perforation pattern 72. The grill 74 shown in FIG. 5 is secured to the support members 54,56 to hide this assembly and to prevent passenger items from falling behind the grille, while allowing airflow therethrough.

In a commercial aircraft, the thin perforated film as described above would preferably be placed along the length of the opposing sides of the aircraft to allow decompression response. As an example, in an MD11, the aircraft will have approximately 90 bays with the frangible decompression protection panel; each bay having a flow area of approximately 93–98 sq. in.

This design is much lighter than the previously described vent box design, which may improve aircraft performance. Additionally, this design eliminates the mechanical components of the vent box, which increases reliability, and the design also eliminates leakage problems.

While embodiments of this invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A frangible aircraft floor for an aircraft having an outer side wall and an outboard seat track, the floor comprising:
   floor support having at least one opening formed therethrough between the outer side wall and the outboard seat track; and
   a thin film positioned across said at least one opening, said thin film including a frangible seam formed in a manner to rupture when a predetermined pressure difference exists on opposing sides of the film to allow increased airflow in either direction through said at least one opening.

2. The frangible aircraft floor of claim 1, wherein said thin film comprises a plurality of apertures formed therein to allow a predetermined amount of air flow through the thin film in an unruptured state.

3. The frangible aircraft floor of claim 1; wherein said thin film comprises mylar.

4. The frangible aircraft floor of claim 1, further comprising a frame positioned between said floor support and said thin film.

5. The frangible aircraft floor of claim 4, further comprising a silicon adhesive securing said thin film to said frame.

6. The frangible aircraft floor of claim 1, wherein said frangible seam comprises a plurality of intersecting perforation lines formed in the thin film, said plurality of perforation lines being arranged such that rupture of said thin film along said plurality of perforation lines results in opening a major portion of the thin film for air flow therethrough.

7. A method of equalizing pressure in an airplane, between a passenger compartment and a cargo compartment positioned below the passenger compartment and separated therefrom by a floor assembly, wherein the airplane includes an outer side wall and an outboard seat track, the method comprising:
   positioning a thin frangible film having an aperture therein upon a floor support having an opening extending between the passenger and cargo compartments, and between the outer side wall and the outboard seat track;
   equalizing the pressure between the passenger and cargo compartments during normal operating conditions by freely passing air through the aperture in the thin frangible film; and
   automatically rupturing the thin frangible film when a predetermined pressure difference exists between the passenger and cargo compartments in order to allow airflow in either direction through the floor support enabling rapid pressure equalization between the passenger and cargo compartments in the event of a sudden loss of pressure in one of the compartments, thereby limiting pressure load on the floor assembly.

8. The method of claim 7, further comprising providing a plurality of perforated lines in the thin frangible film to cause the thin frangible film to rupture when the predetermined pressure difference is reached.

9. A frangible aircraft floor for an aircraft having an outer side wall and an outboard seat track, the floor comprising:
   a floor support having at least one opening formed therethrough;
   a frame positioned on the floor support;
   a thin mylar film positioned across said at least one opening, said thin film being perforated in a manner to rupture when a pressure difference between 0.2 and 0.75 psi exists on opposing sides of the film to allow increased airflow in either direction through said at least one opening.

10. The frangible aircraft floor of claim 9, wherein said thin mylar film has a plurality of apertures formed therein to allow a predetermined amount of air flow therethrough.

11. The frangible aircraft floor of claim 9, further comprising a silicon adhesive securing said thin mylar film to said frame.

12. The frangible aircraft floor of claim 9, wherein said perforations are arranged such that rupture of said thin mylar film along said perforations results in opening a major portion of the thin film for air flow therethrough.

\* \* \* \* \*